United States Patent
Susak et al.

[11] Patent Number: 5,742,155
[45] Date of Patent: Apr. 21, 1998

[54] ZERO-CURRENT START-UP CIRCUIT

[75] Inventors: David M. Susak, Phoenix; Joseph A. Thomsen, Gilbert, both of Ariz.

[73] Assignee: Microchip Technology Incorporated, Chandler, Ariz.

[21] Appl. No.: 755,682

[22] Filed: Nov. 25, 1996

[51] Int. Cl.⁶ .................. G05F 1/62; G05F 3/16; H02M 1/12
[52] U.S. Cl. .................. 323/901; 323/313; 363/49
[58] Field of Search .................. 323/901, 313, 323/314; 363/49

[56] References Cited

U.S. PATENT DOCUMENTS

| | | | |
|---|---|---|---|
| 4,740,742 | 4/1988 | Gontowski, Jr. | 323/313 |
| 4,809,150 | 2/1989 | Limuti et al. | 363/49 |
| 4,902,959 | 2/1990 | Brokaw | 323/314 |
| 4,961,007 | 10/1990 | Kumanoya et al. | 323/314 |
| 5,038,059 | 8/1991 | Ebzery et al. | 307/518 |
| 5,172,409 | 12/1992 | Susak | 379/377 |
| 5,233,508 | 8/1993 | Yamamura et al. | 363/49 |
| 5,532,576 | 7/1996 | MacRobbie et al. | 323/274 |
| 5,631,548 | 5/1997 | Susak | 323/273 |
| 5,640,083 | 6/1997 | Alexis | 323/313 |

*Primary Examiner*—Peter S. Wong
*Assistant Examiner*—Bao Q. Vu
*Attorney, Agent, or Firm*—Harry M. Weiss; Jeffrey D. Moy; Harry M. Weiss & Associates, P.C.

[57] ABSTRACT

A zero-current start-up circuit for a reference circuit which is initially unbiased and which has internal nodes that needs to be regulated to a predetermined voltage. When the start-up circuit is enabled, a switching transistor is turned on which enables the reference circuit to generate an internal reference current which regulates an output current to a predetermined value set by the reference circuit. The output current flows through a voltage drop device and when the voltage level reaches a predetermined value, the start-up circuit is disabled eliminating the current path.

26 Claims, 2 Drawing Sheets

ZERO-CURRENT START-UP CIRCUIT

BACKGROUND OF THE INVENTION

1. Field of the Invention

This invention relates generally to start-up circuits and, more specifically, to a zero-current start-up circuit for reference circuits having internal nodes that need to be quickly charged to a predetermined voltage level.

2. Description of the Prior Art

In certain types of circuits, there are internal nodes that need to be quickly charged to a predetermined voltage level. Presently, most circuits use a start-up circuit in order to drive these nodes to the prescribed voltage level. The classic start-up circuit uses a bias resistor which is directly coupled to a diode connected transistor. A switching transistor is coupled to the diode connected transistor and sends a signal to the circuit in order to drive the prescribed nodes to the predetermined voltage level.

The problem with these types of start-up circuits is that there is not enough gain in the start-up circuit feedback loop. This causes slow start-up times. This is especially problematic for an EEPROM which uses a bandgap reference for charge pump voltage regulation. The bandgap reference circuit must be started every time the EEPROM is programmed. Since the programming time is approximately 5 ms, the start-up time for the bandgap reference circuit must be much less than this time period.

Another problem with the aforementioned type of start-up circuit is that the switching transistor draws a static current through the bias resistor. The static current draw may be anywhere from 5 µA to 10 µA in magnitude. In order to lower the static current draw, large resistors must be used for the bias resistor. However, this creates another problem since large resistors consume larger amounts of valuable silicon real estate.

Therefore, a need existed to provide an improved start-up circuit. The improved start-up circuit must be able to generate faster start-up times for the reference circuits which are driven by the improved start-up circuit. The improved start-up circuit must also reduce the static current draw of the prior art start-up circuits. Furthermore, the improved start-up circuit must reduce the static current draw without requiring large bias resistors.

SUMMARY OF THE INVENTION

In accordance with one embodiment of the present invention, it is an object of this invention to provide an improved start-up circuit.

It is another object of the present invention to provide an improved start-up circuit that is able to generate faster start-up times for the reference circuits which are driven by the improved start-up circuit.

It is another object of the present invention to provide an improved start-up circuit that reduces the static current draw of prior art start-up circuits.

It is still another object of the present invention to provide an improved start-up circuit that does not draw a static current and which does not require large bias resistors.

BRIEF DESCRIPTION OF THE PREFERRED EMBODIMENTS

In accordance with one embodiment of the present invention, a zero-current start-up circuit is disclosed. The start-up circuit is used for quickly driving internal nodes within a reference circuit to a predetermined voltage level. Kick start means are coupled to the reference circuit for sending a signal to the reference circuit which generates a reference current within the reference circuit and which regulates an output current to a predetermined value set by the reference circuit. Current mirror means are coupled to the reference circuit for outputting the output current. Voltage drop means are coupled to the current mirror means for generating a voltage drop when the output current is run through the voltage drop means. Logic gate means having a logical level input and a second input which is an absolute level input which is coupled to the voltage drop means are provided for generating an output signal to activate the kick start means and for generating an output signal to deactivate the kick start means. The logic gate means uses a latch means for providing two stable output states. NAND gate means having a first input coupled to the latch means and a second input coupled to the logic level input are used for generating a logic level output based on the first input and the second input. Switching means are coupled to the latch means and have a first input coupled to the voltage drop means and a second input coupled to the logic level output of the NAND gate for switching the latch means from a first stable state to a second stable state and from the second stable state to the first stable state.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
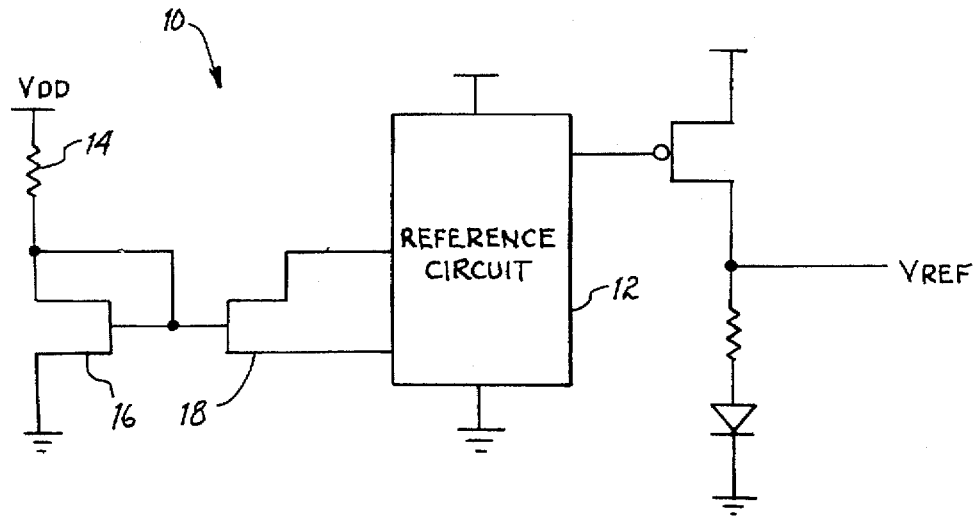
FIG. 1 is a simplified electrical schematic of a prior art start-up circuit.

Referring to FIG. 1, a prior art start-up circuit 10 is shown. The start-up circuit 10 has a reference circuit 12 which has internal nodes which have to be driven to a predetermined voltage level in a short amount of time. The start-up circuit 10 uses a bias resistor 14 to drive a diode connected transistor 16. As stated above, the problem with the start-up circuit 10 is that there is not enough gain in the feedback loop consisting of transistor 18 and reference circuit 12. This causes the start-up circuit to have slow start-up times. Furthermore, the transistor 16 draws a static current through the bias resistor 14 in the magnitude of about 5 µA to 10 µA.

Figure 2:
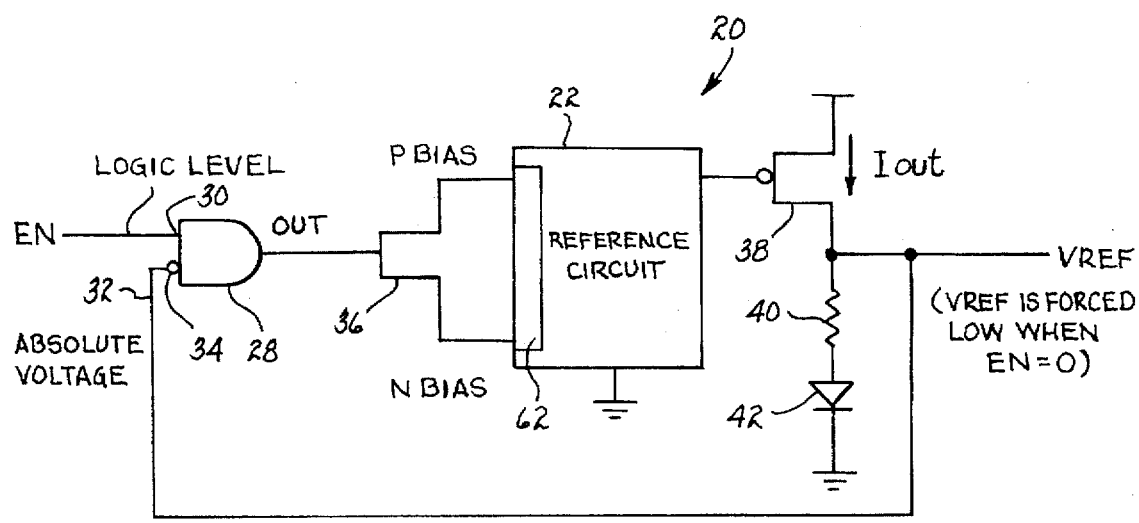
FIG. 2 is a simplified electrical schematic of the start-up circuit of the present invention.

Referring to FIG. 2, a zero-current start-up circuit 20 (hereinafter start-up circuit 20) of the present invention is shown. Like the start-up circuit 10 shown in FIG. 1, the start-up circuit 20 has a reference circuit 22 which has internal nodes which have to be driven to a predetermined voltage level in a short amount of time. Without the start-up circuit 20, the internal nodes in the reference circuit 22 would be held low or held high. There is nothing inherent in the reference circuit 22 to drive the nodes to the predetermined voltage level.

Figure 3:
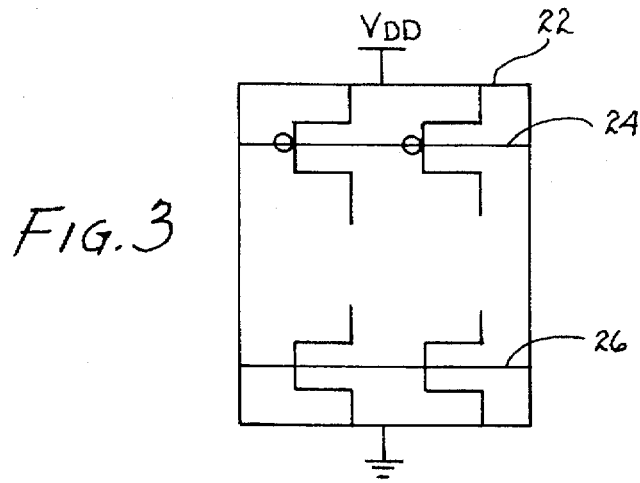
FIG. 3 is a simplified electrical schematic of a P-bias and N-bias rail used in the start-up circuit depicted in FIG. 2.

The reference circuit 22 initially is unbiased. The reference circuit 22 has two stable points when the start-up circuit 20 is not coupled to the reference circuit 22. As shown in FIG. 3, the two stable points of the reference circuit 22 are those along the P-bias rail 24 and those along the N-bias rail 26. These two rails are held at a supply voltage $V_{DD}$ and ground respectively. With the P-bias rail 24 at $V_{DD}$ and the N-bias rail 26 at ground, the reference circuit 22 is not biased. This means that the output current $I_{OUT}$ (FIG. 2) is zero and the voltage at $V_{REF}$ is zero.

Referring back to FIG. 2, the start-up circuit 20 has a logic gate 28. The logic gate 28 has two inputs, a logic level input 30 and an absolute voltage level input 32 which is directly coupled to the node $V_{REF}$. An inverter 34 is coupled to the absolute voltage level input 32. The inverter 34 is used for inverting the incoming input signal. In the embodiment shown in FIG. 2, the logic gate 28 is an AND gate.

The output of the logic gate 28 is coupled to an NMOS transistor 36. The NMOS transistor 36 is used as a switching device. When the output from the logic gate 28 enables the NMOS transistor 36, current will begin to flow in the reference circuit 22. Since the reference circuit 22 is usually built around an amplifier type circuit with negative feedback, once a current begins to flow, the negative feedback will take over and regulate the output current $I_{OUT}$ to a predetermined maximum value set by the reference circuit 22.

A gate of a PMOS transistor 38 is coupled to the reference circuit 22. The PMOS transistor 38 is used as a current mirroring device. The PMOS transistor 38 generates the output current $I_{OUT}$ which is regulated by an internal current within the reference circuit 22. Coupled to the PMOS transistor 38 is a resistor 40 and a diode 42. The resistor 40 and the diode 42 act as a voltage drop mechanism. In the preferred embodiment of the present invention, when the output current $I_{OUT}$ is run through the resistor 40 and the diode 42, a voltage drop of 1.2 volts will be generated.

In operation, when the logic level input to the logic gate 30 is low, the transistor 36 will be off and the reference circuit 22 will remain unbiased. This means that both the output current $I_{OUT}$ and the voltage at $V_{REF}$ will be zero. However, when the logic level input is high, the logic gate 28 will enable the NMOS transistor 36. A current will begin to flow in the reference circuit 22. Since the reference circuit 22 is usually built around an amplifier type circuit with negative feedback, once a current begins to flow, the negative feedback will take over and regulate the output current $I_{OUT}$ to a predetermined maximum value set by the reference circuit 22. Once this occurs, $V_{REF}$ will come up to a certain voltage level which is fed back to the logic gate 28. The high voltage level at the absolute voltage level input 32 will turn off the NMOS transistor 36. When the NMOS transistor 36 is turned off, the reference circuit 22 and the output current $I_{OUT}$ will be self-sustaining at a precision reference level.

Figure 4:
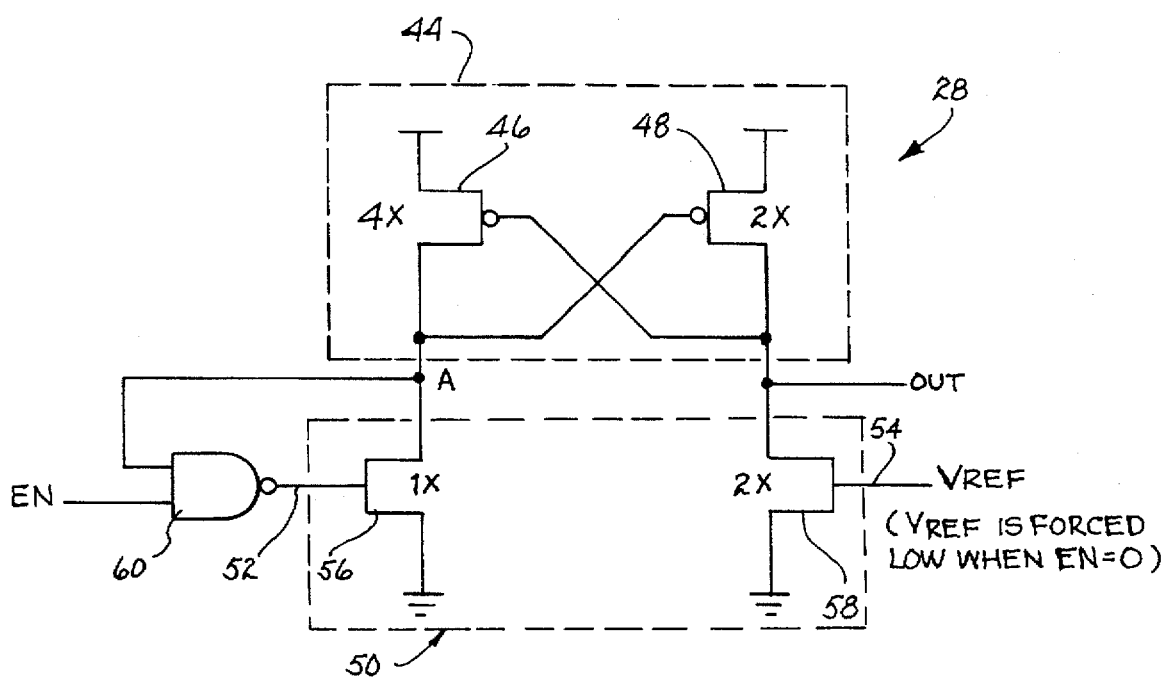
FIG. 4 is a simplified electrical schematic of the logic device used in the start-up circuit depicted in FIG. 2.

Referring to FIG. 4, one embodiment of the logic gate 28 is shown. In this embodiment, the logic gate 28 uses a latch device 44. The latch device 44 has two stable output states. In the first state, the first stage 46 is conducting and the second stage 48 is cut off. In a second state, the second stage 48 is conducting and the first stage 46 is cut off. In the embodiment shown in FIG. 4, the latch 44 uses PMOS transistors as the first stage 46 and as the second stage 48.

A switching device 50 is coupled to the latch 44. The switching device 50 has a first input 52 which is a logic level input and a second input 54 which is an absolute voltage level input. The switching device 50 is used to change the latch 44 from the first state to the second state and from the second state to the first state based on the two inputs 52 and 54. The switching device 50 is comprised of two NMOS transistors 56 and 58. The first NMOS transistor 56 has a gate coupled to a logic level input and a drain coupled to the latch 44. The logic level input is generated by a NAND gate 60 having a first input coupled to an ENABLING signal and a second input coupled to the latch 44. The output of the NAND gate 60 is coupled to the gate of the NMOS transistor 56. The second NMOS transistor 58 has a gate coupled to the absolute voltage level input (i.e. $V_{REF}$) and a drain coupled to the latch 44.

The logic gate 28 is actually a level translator. In a normal level translator the P-Channel transistors must be sized large enough to overcome the N-Channel transistors. If the PMOS transistors are not sized large enough, the switch will not occur. For this reason, on the logic level input side of the level translator, the PMOS transistor 46 is sized four times greater than the NMOS transistor 56. However, on the absolute voltage level input side, since the input is limited to a predetermined voltage level (i.e., 1.2 volts) and is not a full level input, the PMOS transistor 48 and the NMOS transistor 58 may be equally sized. Note that both the PMOS transistor 48 and the NMOS transistor 58 are both sized two times greater than the NMOS transistor 56.

In the embodiment shown in FIG. 4, a gating device 62 (FIG. 2) in the reference circuit 22 (FIG. 1) must be coupled to the NMOS transistor 36. The gating device 62 is used for disabling the NMOS transistor 36 when the ENABLING input signal is low. Thus, during operation, anytime the ENABLING input signal is low, the voltage at $V_{REF}$ will also be low.

Referring to FIGS. 2 and 4, a description of the operation of the embodiment shown in FIG. 4 will be described. When the ENABLING input signal is high and the voltage at Node A is low, the NAND gate 60 will output a high signal which will turn on the NMOS transistor 56 and will keep the voltage at NODE A low. The low voltage at Node A will activate the PMOS transistor 48. With the PMOS transistor 48 active, the voltage at Node OUT will be high which turns on the NMOS transistor 36 (FIG. 2). With the NMOS transistor 36 on, a current will begin to flow in the reference circuit 22. Since the reference circuit 22 is usually built around an amplifier type circuit with negative feedback, once a current begins to flow, the negative feedback will take over and regulate the output current $I_{OUT}$ to a predetermined maximum value set by the reference circuit 22. Once this occurs, $V_{REF}$ will come up to a certain voltage level which is fed back to the NMOS transistor 58. The high voltage level will activate the NMOS transistor 58. When the NMOS transistor 58 is turned on, the voltage at Node OUT will go low. This will activate the PMOS transistor 46 which will pull the voltage at Node A high. This will cause the NAND gate 60 to turn off the NMOS transistor 56 which will in turn deactivate the NMOS transistor 36. When the NMOS transistor 36 is turned off, the reference circuit 22 and the output current $I_{OUT}$ will be self-sustaining at precision reference level.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A zero-current start-up circuit comprising, in combination:

a reference circuit which is initially unbiased and which has internal nodes that needs to be regulated to a predetermined voltage;

kick start means coupled to said reference circuit for sending a signal when activated to said reference circuit which generates a reference current within said reference circuit wherein said reference current regulates an output current to a predetermined value set by said reference circuit once said reference current is generated;

current mirror means coupled to said reference circuit for outputting said output current;

voltage drop means coupled to said current mirror means for generating a reference voltage when said output current is run through said voltage drop means; and logic gate means having a logical level input and a second input which is an absolute level input which is coupled to said voltage drop means for generating an output signal to activate said kick start means and for generating an output signal to deactivate said kick start means after said kick start means has been activated when said reference voltage reaches a predetermined level.

2. A zero-current start-up circuit in accordance with claim 1 further comprising inverter means having an output coupled to said absolute level input for inverting said absolute level input to said logic gate means.

3. A zero-current start-up circuit in accordance with claim 2 wherein said logic gate means is an AND gate.

4. A zero-current start-up circuit in accordance with claim 1 further comprising:

P-bias railing coupled to said kick start means for generating said reference current in said reference circuit when said P-bias rail is pulled down; and N-bias railing coupled to said kick start means for generating said reference current in said reference circuit when said N-bias rail is pulled up.

5. A zero-current start-up circuit in accordance with claim 1 wherein said logic gate means comprises:

latch means for providing two stable output states;

NAND gate means having a first input coupled to said latch means and a second input coupled to said logic level input for generating a logic level output based on said first input and said second input; and switching means coupled to said latch means and having a first input coupled to said voltage drop means and a second input coupled to said logic level output of said NAND gate for switching said latch means from a first stable state to a second stable state and from said second stable state back to said first stable state.

6. A zero-current start-up circuit in accordance with claim 5 wherein said latch means comprises:

a first transistor having a gate coupled to said kick start means; and a second transistor having a gate coupled to said first transistor.

7. A zero-current start-up circuit in accordance with claim 6 wherein said first transistor and said second transistor are PMOS transistors.

8. A zero-current start-up circuit in accordance with claim 7 wherein said switching means comprises:

a first NMOS transistor having a drain coupled to said first transistor and a gate coupled to said output of said NAND gate; and a second NMOS transistor having a drain coupled to said second transistor and a gate coupled to said voltage drop means.

9. A zero-current start-up circuit in accordance with claim 8 wherein said first transistor which is a PMOS transistor is about four times the size of said first NMOS transistor.

10. A zero-current start-up circuit in accordance with claim 8 wherein said second transistor which is a PMOS transistor is about equal in size to said second NMOS transistor and about twice in size to said first NMOS transistor.

11. A zero-current start-up circuit in accordance with claim 5 wherein said reference circuit comprises gating means coupled to said kick start means for disabling said kick start means when said logic level input is low.

12. A zero-current start-up circuit in accordance with claim 1 wherein said kick start means is a transistor.

13. A zero-current start-up circuit in accordance with claim 12 wherein said kick start means is an NMOS transistor.

14. A zero-current start-up circuit in accordance with claim 1 wherein said current mirror means is a transistor.

15. A zero-current start-up circuit in accordance with claim 14 wherein said current mirror means is a PMOS transistor.

16. A zero-current start-up circuit in accordance with claim 1 wherein said voltage drop means generates a voltage drop of about 1.2 volts.

17. A zero-current start-up circuit in accordance with claim 1 wherein said voltage drop means comprises:

a resistor coupled to said current mirror means; and a diode coupled to said resistor.

18. A zero-current start-up circuit in accordance with claim 1 wherein said reference circuit is self sustaining after said output current reaches said predetermined value.

19. A zero-current start-up circuit comprising, in combination:

a reference circuit which is initially unbiased and which has internal nodes that needs to be regulated to a predetermined voltage;

kick start means coupled to said reference circuit for sending a signal to said reference circuit which generates a reference current within said reference circuit and which regulates an output current to a predetermined value set by said reference circuit;

P-bias railing coupled to said kick start means for generating said reference current in said reference circuit when said P-bias rail is pulled down;

N-bias railing coupled to said kick start means for generating said reference current in said reference circuit when said N-bias rail is pulled up;

current mirror means coupled to said reference circuit for outputting said output current;

voltage drop means coupled to said current mirror means for generating a voltage drop when said output current is run through said voltage drop means;

logic gate means having a logical level input and a second input which is an absolute level input which is coupled to said voltage drop means for generating an output signal to activate said kick start means and for generating an output signal to deactivate said kick start means, said logic gate means comprising:

latch means for providing two stable output states;

NAND gate means having a first input coupled to said latch means and a second input coupled to said logic level input for generating a logic level output based on said first input and said second input; and switching means coupled to said latch means and having a first input coupled to said voltage drop means and a second input coupled to said logic level output of said NAND gate for switching said latch means from a first stable state to a second stable state and from said second stable state back to said first stable state; and gating means coupled to said kick start means for disabling said kick start means when said logic level input is low.

20. A zero-current start-up circuit in accordance with claim 19 wherein said latch means comprises:

a first PMOS transistor having a gate coupled to said kick start means; and a second PMOS transistor having a gate coupled to said first transistor.

21. A zero-current start-up circuit in accordance with claim 20 wherein said switching means comprises:

a first NMOS transistor having a drain coupled to said first transistor and a gate coupled to said output of said NAND gate; and a second NMOS transistor having a drain coupled to said second transistor and a gate coupled to said voltage drop means.

22. A zero-current start-up circuit in accordance with claim 21 wherein said first PMOS transistor is about four times the size of said first NMOS transistor.

23. A zero-current start-up circuit in accordance with claim 21 wherein said second PMOS transistor is about equal in size to said second NMOS transistor and about twice in size to said first NMOS transistor.

24. A zero-current start-up circuit in accordance with claim 19 wherein said kick start means is an NMOS transistor.

25. A zero-current start-up circuit in accordance with claim 19 wherein said current mirror means is a PMOS transistor.

26. A zero-current start-up circuit in accordance with claim 19 wherein said reference circuit is self sustaining after said output current reaches said predetermined value.

* * * * *